United States Patent [19]
Grove

[11] Patent Number: 5,922,266
[45] Date of Patent: *Jul. 13, 1999

[54] INJECTION MOLDING

[76] Inventor: Dale Grove, 72 Buckingham Dr., Billerica, Mass. 01821

[*] Notice: This patent is subject to a terminal disclaimer.

[21] Appl. No.: 07/970,608

[22] Filed: Oct. 8, 1992

Related U.S. Application Data

[63] Continuation-in-part of application No. 07/749,937, Aug. 26, 1996, abandoned.

[51] Int. Cl.$^6$ .................................................. B29C 45/00
[52] U.S. Cl. ..................................... 264/297.2; 264/297.8; 264/328.7; 264/328.8; 264/328.9; 264/328.11; 264/328.12; 264/328.13
[58] Field of Search ..................................... 264/318, 334, 264/328.1, 328.7–328.9, 328.11–328.13, 297.2, 297.8; 425/DIG. 58, 577, 588, 554–556, 590, 592, 593, 595, 574, 575, 441, 443, 4.38, 451.2, 451.5, 451.6, 451.9

[56] References Cited

U.S. PATENT DOCUMENTS

| | | | |
|---|---|---|---|
| 3,016,574 | 1/1962 | Fischer et al. | 264/328.7 X |
| 3,632,729 | 1/1972 | Bielfeldt | 264/328.7 X |
| 3,898,314 | 8/1975 | Church | 264/338 X |
| 4,075,266 | 2/1978 | Theysohn | 264/328.7 X |
| 4,375,781 | 3/1983 | Bessho | 425/590 X |
| 4,540,534 | 9/1985 | Grendol | 264/328.12 X |
| 4,589,830 | 5/1986 | Clawson | 425/590 X |
| 4,620,958 | 11/1986 | Wiechard | 264/297.2 |
| 4,707,321 | 11/1987 | Segawa et al. | 264/328.7 X |
| 4,828,769 | 5/1989 | Maus et al. | |
| 4,832,591 | 5/1989 | Thompson | 425/451.6 X |
| 4,849,151 | 7/1989 | Tamura et al. | 425/595 X |
| 4,900,242 | 2/1990 | Maus et al. | 42/555 X |
| 4,938,679 | 7/1990 | Pietrorazio | 425/DIG. 58 X |
| 4,980,115 | 12/1990 | Hatakeyama et al. | 264/328.7 |
| 4,981,634 | 1/1991 | Maus et al. | 425/556 X |
| 5,015,426 | 5/1991 | Maus et al. | 425/575 X |
| 5,044,925 | 9/1991 | Watanabe | 264/328.7 X |
| 5,061,429 | 10/1991 | Yoshihara et al. | 425/577 X |
| 5,068,065 | 11/1991 | Maus et al. | 264/334 X |

FOREIGN PATENT DOCUMENTS

| | | | |
|---|---|---|---|
| 145078 | 11/1980 | Germany | 425/555 |
| 102328 | 6/1982 | Japan | 425/555 |
| 67126 | 4/1986 | Japan | 425/555 |
| 89308 | 4/1988 | Japan | 425/555 |

*Primary Examiner*—Karen Aftergut
*Attorney, Agent, or Firm*—George E. Kersey, Esq.

[57] ABSTRACT

Method and apparatus for forming an article having a prescribed volume and mass from a molten plasticized resin using an injection molding machine by (a) forming an oversized mold cavity with respect to an opposing pair of relatively movable mold members between which the article is formed; (b) injecting into the oversized mold cavity a volume of plasticized resin exceeding the prescribed volume of the article and having a mass at least equal to the prescribed mass of the article; (c) applying force to the mold members to reduce the volume of the cavity and pressurize the plasticized resin therein simultaneously with the injection of resin.

16 Claims, 6 Drawing Sheets

INJECTION MOLDING

This is a file wrapper continuation-in-part of Ser. No. 07/749,937 filed Aug. 26, 1991, now abandoned.

BACKGROUND OF THE INVENTION

I. Field of the Invention

This invention relates to the injection molding of plastic materials, and more particularly to the injection molding of products with precisely defined surfaces, such as those which are required to meet optical standards.

While the invention is particularly desirable for products with optical surfaces standards, it can be used generally for the molding of thermosetting and thermoplastic materials.

Optical quality products are in wide use. They are used generally for assays where test substances are subjected to examination by electromagnetic radiation, including visible light. Optical products are also used for instruments, such as microscopes and ophthalmic devices.

Devices that require optical surfaces originally were prepared by grinding glass members. Such products now increasingly employ plastics to expedite manufacture and reduce cost. In general, the demand for plastic optical products is now considerably greater than for glass.

The shift from glass to plastic has occurred primarily because plastic is lighter and often has superior qualities. In addition, protective coatings to provide scratch and abrasion resistance for plastics have become available. Plastic also comes in a wide range of gradient-density tints and colors.

Of the many advantages exhibited by plastics, their relatively light weight and durability have proved to be significant. For optical surfaces, the lens thicknesses are the same for glass and plastic. Consequently, the reduced density of plastic produces a product that is of lighter weight.

The reduction in weight and density is particularly important when high powered surfaces are required, or when large optical surfaces are needed.

Previously, devices with large optical surfaces, particularly those of high power, were typically manufactured by the casting of thermoset resins, for example acrylics that were peroxide cured. However, the availability of polycarbonates and related thermoplastics permits the replacement of cast thermoset plastics. This is because modern polycarbonates have low densities and high refractive indices. For the same optical thicknesses, polycarbonates have an even lower weight than cast plastics, and far lower than glass.

Additionally, since polycarbonates have great impact strength and breakage resistance, they permit the production of relatively thin optical members. Moreover, coatings for polycarbonates are available to provide abrasion resistance. Polycarbonates are particularly suitable for products with "single" optical surfaces, i.e., those with frontal convex and/or backside concave surfaces.

Optical surfaces are defined by two measures of the ray bending power of light or other waves. Spherical power produces magnification and/or reduction, while cylindrical power produces astigmatic corrections. The units of corrective power are in diopters. It often is desirable to have product available with a spherical power in the range from +4 (magnification) to −6 (reduction) diopters, and a cylindrical power in the range from 0 to +2 diopters. Within this range, a volume-frequency distribution can be plotted, centered at zero power. There is reduced frequency in the plot as spherical or cylindrical power increases or decreases.

To be competetive, injection molded products require high yields, with a reduction in scrap and secondary operations, such as trimming.

Additionally, it is desirable to run optical surfaces of differing powers at the same time, without sacrificing productivity, quality or yields. A four-cavity moldset, for example, quadruples the productivity of a particular molding machine. Two of the cavities can be used to mold common spherical and cylindrical power combinations. The remining cavities can be used for less common surfaces.

An illustrative optical surface is found on an optical disk for the laser reading and storage of information. Optical disks for video respond to analog signaling, while compact digital disks are for audio signals. There also is a wide range of computer program disks for information and data storage. These include the CD/ROM (Compact Disk/Read-Only Memory) which is irreversibly encoded with program information, DRAW (Disk Read And Write, i.e. "user write once") and EDRAW (Erasible, i.e. "by the user", Disk Read And Write).

Many disks are encoded during molding by a "stamper", which forms a face surface in the mold cavity. The digital information is represented on the stamper by a spiral of tiny projections, which, in turn, form indentations in the plastic molded disk. A typical indentation has a depth of 0.1 micron and a length of 1–3.3 microns, with a track pitch of 1.6 microns for a spiral array that extends radially outward.

One requirement of high quality molding is intimate contact of the polymer melt with the stamper, without any voids or premature shrinkage. Contact is maintained from the time the cavity is filled with melt until cooling takes place below the glass-transition temperature of the plastic.

Another requirement for optical products is reduction of internal stresses, i.e. "orientation", within the polymer. Ideally, the molding should be "isotropic", i.e., exhibit the same properties in all directions, so that molded stresses and flow induced orientations are eliminated. Such stresses and orientations produce localized differences in ray bending power. The resultant nonuniformities in refractive index are measured in terms of optical path differences, commonly expressed as "birefringence". Avoidance of birefringence is desired.

With surfaces that employ laser signal reading, any flaw which disrupts or deflects the laser beam causes errors. Other properties which require consideration are percentage of light transmission, percentage haze, and the index of discoloration. Localized flaws include opaque specks or clear areas, such as voids or bubbles, which have different refractive indices and optical bending power than adjacent material. Absolute planarity or flatness are often needed where localized warpage would induce prismatic effects and result in off-axis signal transmissions.

In the molding of many optical surfaces it is necessary to conduct operations in clean or "white" rooms. Such rooms provide particle free environments in the range from Class 1,000 to Class 10. Since workers are the biggest source of contamination, automation of handling and post-molding operations is desirable.

Furthermore, for efficiency, microprocessor or CNC (computer numerical control) control should be used. The molding machines also should have individual moldsets, temperature controllers and hopper dryers. A clean air shower is needed for the clamp open and part removal position, together with robotic part pickers.

While optical molding commonly employs a single cavity mold, that makes inefficient use of clean room floor space, and results in a high captial and equipment fixed cost per part. Consequently, it is desirable to produce optical quality parts with multiple cavity molds.

II. The Prior Art

(a) Straight Injection Molding

Early attempts to make acrylic or polycarbonate optical parts used injection molding with the mold cavity surfaces fixed throughout the molding cycle. This required long cycles, high mold surface temperatures approaching the glass-transition temperature of the plastic, along with high plastication and melt temperatures. Slow, controlled fill rates were followed by high packing pressures, which were held until the completion of gate freeze-off.

Fixed cavity processes employ large gating and runner systems to permit appreciable packing pressure and delivery of material before gate freeze-off occurs. At that time no further transfer of molten polymer occurs. Gate freeze-off in fixed cavity injection presents a problem with surfaces having differing radii of curvature. It is the differences in curvature that produce the necessary ray bending needed for optical surfaces. Differing cross-sectional thicknesses result in non-uniform shrinkage during part formation and subsequent cooling. The thickest sections of optical parts are subject to sink marks or depressions which interrupt an otherwise uniform surface. This results in localized aberrations in ray bending character.

Even when care is taken that the injected polymer conforms to the surface of a fixed mold cavity, once gate freeze-off occurs, that prevents additional packing pressure and material transfer. This usually takes place in the thinnest cross-sectional area of the part, and differential shrinkage begins to occur within the melt. The polymer skin then pulls away from the mold surface, with greatest effect in the thickest cross sections. Pre-release, whether partial or complete, of the molded plastic before the cavity is unlocked and opened, detrimentally affects optical quality. The molded contours no longer provide precision surfaces.

Similar problems occur in the straight injection molding of parts with high aspect ratios, i.e., where there are relatively large surface dimensions and relatively small thicknesses. In those cases, a long length of flow is required through a small cross-sectional orifice of the mold cavity.

(b) Polymer Resins

The most widely used polymers for the molding of parts with optical surfaces are polycarbonates and thermoplastic acrylics, particularly polymethyl methacrylate (PMMA).

Acrylics inherently have better flow at low melt temperatures, as well as low birefringence or polymer disorientation. However, they have relatively high water absorption which results in swelling and warpage, and relatively low creep resistance. Susceptibility to heat distortion make acrylics less desirable, except for products, such as video disks, where parts are cemented together with encased information.

Polycarbonates, on the other hand, can have better performance, but are subject to serious processing limitations. Ordinary grades of polycarbonate have a low melt-flow index range, but higher melt-flow grades are available.

Even with high flow grades, the straight injection of polycarbonate causes high birefringence. This is because the mold cavity has fixed dimensions which do not change during the molding cycle, and exceed the finished part by a shrinkage compensation factor.

Polycarbonates are in amorphous chains that form random coils when in a relaxed state. When polycarbonate melt is forced through a restrictive flow path, or orifice, by high injection pressures the polymer distorts from stretching and shearing, realigning the polymer chains so that they are parallel to one another. This is believed to create severe anisotropy, i.e., nonuniformity. The incoming melt front can be regarded as a dynamically stretching zone of molten polymer. In this frontal zone, disorientation is caused by the shear of one polymer layer over another. This is a result of unavoidable velocity differences because the center of flow is faster than at the edges. In the resulting velocity profile, the lowest velocities are at the mold surface, and the highest velocity is at the center. A slowly moving melt front, at low pressure, produces a front that is less distorted and less stressed.

In straight injection molding of polycarbonates, injection is at the highest speed of the hottest, most fluid, polycarbonate melt into the narrow constrictions of a fixed cavity mold.

Elaborate plastication is needed to provide the hottest melt without catastrophic degradation in straight injection molding. Being less viscous, a hot melt provides less internal shear and slower freeze. This allows more time for melt relaxation after flow ceases, and before solidification.

Such plastication can use starved feeding or a reduced sized barrel/screw combination. This minimizes the residence time of the polycarbonate polymer in the injection plastication unit, since high melt temperatures are required. Some plastications cause high shearing of the melt and suffer more polymer degradation.

The balance between degradation flaws—from a hot plastication melt—and high disorientation—from a fast fill rate into a high aspect ratio and restrictive mold cavity, creates a narrow "process window". This has made straight injection suitable only for single cavity molding. Multiple cavity straight injection would result in cavity imbalance.

Another difficulty with straight injection is that the contents of the mold cavity gradually shrink during cooling. This causes the part to pull away from the mold surfaces. Premature release can produce differential warpage or imprecise replication of surface contour patterns. Straight injection uses high injection pressures to maintain cavity pressure until gate freeze-off occurs. However, this application of pressure also causes reextrusion or cold-flow of the increasingly viscous polymer core within the fixed dimensions of the mold cavity. Such forcible redistribution of the partially-solidifying melt creates internal stresses resulting in birefringence.

(c) Injection/Compression Molding

To overcome the difficulties associated with straight injection, resort has been made to mold cavity compression after injection. There are three types: (1) clamping injection/ compression, where compression is by platen motion; (2) auxilary component injection/compression, where there is full machine clamping with no platen motion, and mold-cavity compression is by auxilary components internal to the moldset; and (3) clamping, and auxiliary component injection/compression, where mold cavity compression is by clamping and auxiliary component motion.

(C-1) Martin U.S. Pat. No. 2,938,232

As disclosed in Martin U.S. Pat. No. 2,938,232 ("Martin '252") for toggle-clamp injection molding, issued May 31, 1960 and known as a "sandwich press", the mold platens and mold halves are brought together until a predetermined air gap is present at the parting line. At that point, a low pressure, low velocity injection fill begins.

After injection is completed and the molten polymer mass has cooled for a predetermined interval, the machine commences closure of the movable platen. This mechanically seals the mold cavity and its partially solidified contents with zero-clearance at the parting line. The mold halves are locked for the duration of the molding cycle at a predetermined clamp pressure. The partially solidified polymer mass is compressed by the amount of the air gap that existed at the parting line when injection started. By eliminating the air gap, the volume of the cavity and runner system is proportionately affected, resulting in compressive forces exerted upon the partially solidified polymer and causing a reorientation and re-flow. Under clamp induced compressive force, the mold cavity contents continue cooling and solidifying, eventually reaching a temperature sufficiently below glass-transition temperature that the molded part may be ejected without optical distortion.

The result is clamp induced "coining" which offers advantages over straight injection. Successful coining is a function of initial injection pressure and fill rate, air gap dimensions, the timing interval between injection and compression, and the magnitude of the final clamping forces.

Control over injection pressure and fill rate, along with timing are critical. In order to prevent molten polymer from spilling outside the mold cavity, the injected melt must form a surface skin and partially solidify. Otherwise, molten polymer spills into the air-gap and necessitates trimming of the molded part.

If the melt has solidified excessively, compression at ultimate clamping pressures can cause deformation at the parting line and damage the moldset. The cooling interval is critical to achieving acceptable yields. If the melt is not sufficiently solidified at its most constrictive point, partially molten polymer can be extruded out of the cavity and into the runner system. This can result in an underfilled and underpacked part with badly distorted surfaces. However, if compression is delayed too long, too much polymer solidification will occur when the compressive force is initiated. This results in forceable reorientation of the polymer and "cold working" of the plastic, producing birefringence and undesirable molded-in stresses.

Bartholdsten U.S. Pat. No. 4,409,169

To alleviate these problems of Martin '232, Bartholdsten et al U.S. Pat. No. 4,409,169 teaches a slow, low-pressure injection of an oversized shot into a mold that is partially-open at the parting line, followed by deliberate melt cooling, viscosity thickening and a short pressing stroke to squeeze from the reduced mold cavity volume the partially cooled and viscous excess plastic. As pressing continues to the fully closed parting line position, radially extruded overflow is pinched. Full clamping is maintained for shrinkage compensation and avoidance of prerelease.

Matsuda U.S. Pat. Nos. 4,442,061 and 4,519,763

Another clamp induced coining process is disclosed by Matsuda et al in U.S. Pat. Nos. 4,442,061 and 4,519,763. Melt is injected into a slightly opened moldset and cooled until fully solidified. The melt is then reheated uniformly above the melt temperature, at which point a clamp actuated compressive stroke is delivered and maintained throughout a second cooling cycle.

(C-2) Auxiliary Injection/Compression

Another type of injection/compression molding makes use of auxiliary components, such as springs or cylinders to apply compressive force to internal and opposing mold surfaces. The primary difference over clamping injection/compression is that mold compression is provided by a stroke producing element, "whereas mold compression in auxiliary component" molding is provided by auxiliary springs or hydraulic cylinders. Furthermore, clamping injection/compression is sequenced and coordinated by process control, while auxiliary component compression is controlled by self-action, like springs, or separately by timers.

A further distinction is that auxiliary component compression does not employ the motion of a movable platen to provide compressive forces to reduce cavity volume. Instead the mold is fully clamped with no relative motion of the clamp plates, or of fixed and movable platens, during the injection fill, cavity reduction compression, or cooling.

Examples of auxiliary component injection/compression molding are discussed below.

Johnson U.S. Pat. No. 2,443,286

In Johnson U.S. Pat. No. 2,443,286, issued Jun. 22, 1948, spring loaded, movable dies are employed within the mold-set. This creates a variable volume mold cavity, but relies upon high internal polymer melt pressure to spread the movable dies against resisting spring pressure. In order to apply a sufficiently great compressive force to the solidifying contents, substantial spring forces are needed. However, the greater the spring force, the greater the injection pressure needed to compress the springs during variable cavity fill. The greater the injection pressure, the greater the degree of molded-in stress and unsatisfactory birefringence. This type of process generally is limited to production of weak optics with small surfaces and limited thickness.

Weber U.S. Pat. Nos. 4,008,031 and 4,091,057

Another auxiliary component process is disclosed in Weber U.S. Pat. Nos. 4,008,031 and 4,091,057. A variable volume cavity is formed by injection melt and pressure induced rearward deflection of at least one movable die. After an interval, forward displacement results in compression under the driving force of an auxiliary hydraulic cylinder mounted in a one-to-one relationship with the movable die. Flow ports are provided for excess, increasingly viscous and partially cooled injected polymer melt which is extruded from the cavity under compressive forces.

Weber teaches slow mold fill, and, as with conventional clamp induced coining, relies upon a preset lapse of time between completion of injection fill and commencement of compressive pressure. Accordingly, Weber is faced with the problems of premature compression, i.e., inadequate solidification, or delayed compression, i.e., late solidification.

In addition, Weber can produce inconsistent parts with variable thicknesses. Depending upon the timing interval, the travel of the movable die is controlled by the length of time elapsing after molten plastic enters the variable cavity and pressure is applied to the movable die. The final volume of the cavity also is controlled by the time elapsing after molten plastic enters the variable cavity, and by the length of time that pressure is applied to the movable die. The result is product variation within the same production run, and thickness variations.

Moreover, when Weber employs a two cavity mold the compression of each cavity is controlled by a separate and independent hydraulic cylinder. Consequently, the two cavities are not simultaneously acted upon by a common component. The larger the number of cavities, the larger the expected variations.

Laliberte U.S. Pat. No. 4,364,878

Another auxiliary component process is disclosed by Laliberte in U.S. Pat. No. 4,364,878. Laliberte includes a movable die coupled to an auxiliary hydraulic cylinder. After the mold is closed under clamp pressure, the mating die parts are spread apart. A precise, volumetrically metered shot that is just adequate to fill the fully-compressed mold cavity is then injected. This control of shot size allows compression without displacement of partly solidified melt out of the mold cavity through an overflow port. The result is greater control over part thickness, eliminating scrap waste and trimming.

However, Laliberte is limited to one-cavity production by reliance upon precisely metered melt, corresponding oneto-one with the injected melt. In addition, there is dependence upon an individually controlled and sequenceable hydraulic cylinder in a one-to-one motion relationship with a variable volume cavity.

While auxiliary component processes have to some degree been useful in molding optical surfaces, they cannot be applied generally.

Compressive forces for auxiliary component molding are much less than those available through clamp actuated coining. This limitation is particularly troublesome for optical surfaces with large projected areas and the necessity for intimate contact with the melt.

(C-3) Clamp and Auxiliary Component Injection/Compression Maus & Galic U.S. Pat. No. 4,828,769

Another prior art technique with clamp and auxiliary component injection/compression is disclosed in U.S. Pat. No. 4,828,769 which issued May 8, 1989 to Steven M. Maus and George J. Galic for injection/compression molding. According to this teaching, an article is formed from a plasticized thermoplastic resin using an injection molding machine in which an opposing pair of mold inserts are initially separated to form a pre-enlarged cavity.

A mass of plasticized resin, slightly larger than the volume of the article to be formed, is injected into the mold cavity. The main clamp force of the injection molding machine is initiated, shortly before completion of the injection to overcome inertial effects. After the completion of injection, the clamping reduces the volume of the closed mold cavity in order to redistribute the resin. The main clamp force is applied until a final clamp lock position is reached.

In addition, the molding machine has first and second mold platens, first and second parting line mold plates, a plurality of parting line. The first and second mold plates, and the first and second mold inserts, are respectivly commonly supported by the first and second mold platens. The mold plates initially are urged together to eliminate any parting line air gap.

Objects of the Invention

Accordingly it is an object of the invention to expedite the molding of articles, particularly those which have optical surfaces.

Another object is to overcome the difficulties associated with prior art straight injection, clamping injection, and auxiliary component injection, and injection-compression parting line molding where compression of melt takes place after injection is completed.

SUMMARY OF THE INVENTION

The invention is directed to simultaneous injection and pressurization molding which is particularly useful in producing, for example, optical quality products at high output yields and reduced cost.

One method according to the invention includes forming an article from a plasticized resin using an injection molding machine. A closed and enlarged mold cavity is formed for receiving plasticized resin without introducing significant back pressure. A mass of plasticized resin, equal or larger than the mass of the article to be formed, is injected into the mold cavity. Simultaneously with the injection of melt, pressure is applied to reduce the volume of the closed mold cavity and redistribute the resin within the mold. This compresses the resin, which solidifies.

The invention also includes the formation of a multiplicity of articles simultaneously from plasticized resin.

In accordance with one aspect of the invention, a homogeneously plasticized polymer, such as a polycarbonate, acrylic, polymer styrene, ABS (acrylic styrene) or EKTAR (a Kodak copolymer of polycarbonate and styrene), is prepared in a reciprocating screw injection molding machine that is equipped with process controls, preferably an open or closed loop microprocessor, or conventional molding machine controller.

A reciprocating screw delivers a precisely-metered volume of melt, greater than or equal to the total mass needed to form parts, for example, by a runner system connected in fluid communication with mold cavities and a nozzle source.

In accordance with another aspect of the invention, a variable volume cavity is created by "resilient" members that are internal to the moldset, and preferably mounted on a movable platen. During injection fill, the volume of the cavity is progressively reduced until the volume equals or exceeds the volume of the injected mass, which is greater than the volume of the resulting finished article. This compensates, upon completion of cooling, for shrinkage and subsequent demolding.

The variable cavity can be produced by, first, presetting the stroke distance before injection, to establish a predetermined distance between a first "soft-close" position of the movable platen and the ultimate position of the movable platen when the associated mold member is at its maximum displacement position. The distance between the two positions of the pressing stroke is designated as the "cavity compression stroke length". Second, a die framing member "floats" on a platen with a small deflection force needed for displacement as the cavity is decreased while the injection of melt takes place.

In accordance with another aspect of the invention, the injection of resin occurs at a relatively high fill rate, but, because of the variable volume cavity, the injection is at reduced pressure at entry points of the cavity. This reduces resulting molded-in stresses and internal strains in the molded part.

In accordance with a further aspect of the invention, the pressurization of the melt is initiated before or simultaneously with injection. The stroke can be profiled using sensors, such as those associated with screw position, even before the screw has actually begun its travel, and before and during subsequent full delivery of the predetermined injection shot size. Early sensing, even before injections, compensates for the inherent inertia in commencing actual pressurization travel of the movable platen.

The melt pressurization is monitored in accordance with further motion of the movable platen, but other machine elements, such as the ejector, could be used instead. Changes in position and velocity are determined by numerically controlled clamp profiling, for example using an opened or closed loop microprocessor, or conventional molding machine process controller. The pressurization can be "single stage" in which increasing back pressure of the melt progressively slows the pressurization stroke.

Preferably the pressurization is multi-stage, with at least one relatively fast phase and one relatively slower phase. The faster phase helps displace any void volume or gas in the oversized cavity and quickly commences pressurized redistribution of the relatively hot, minimally solidified thermoplastic mold cavity contents into its preferred isotropic orientation. This assures intimate contact with precisely polished mold surfaces, to produce the desired molded part configuration. The last stage of the multi-stage pressurization proceeds at a comparatively slower travel and is largely used to maintain intimate contact between the cooling and shrinking polymer mass and the mold surfaces to avoid prerelease and optical distortions.

A multistage pressurization can include any number of intermediate steps, but preferably includes at least one relatively fast travel step, followed by a relatively slower travel step. This is to maintain molded part shrinkage control throughout the cooling process until the molded part is well below its glass transition temperature and ready to be ejected.

In accordance with still another aspect of the invention, following multistage pressurization and gradual cooling of the polymer, solidification and cooling are completed to the point where the molded parts can be ejected from the mold. At that time the molding machine clamp is retracted to its fully open position and conventional ejection is employed. Meanwhile, during cooling, the plasticating screw is prepared and metering takes place for the next shot to be delivered on the next molding cycle.

Important features include the use of resilient members to create and define a variable volume and oversized mold cavities. Control of shrinkage is accomplished by exerting suitable force, such as a clamping force, for example, by a movable clamp under process control. Since the clamping motion is the driving force for pressurization, all cavities in a multicavity mold will receive the same pressurization forces at the same time.

Cavity filling desirably takes place at low injection pressures, but the process is not dependent upon commencing pressurization at a preset time interval, with an inherently high level of error, but rather pressurization is determined with comparative precision by sensing a digitally settable screw position using a controller.

DESCRIPTION OF THE DRAWINGS

Other aspects of the invention will become apparent with reference to the drawings that depict several illustrative embodiments of the invention, in which.

DETAILED DESCRIPTION

The following description is merely illustrative of the invention, the scope of which is limited only by the appended claims. Other embodiments will be apparent to those of ordinary skill in the art.

I. Illustrative Overall System

Figure 1:
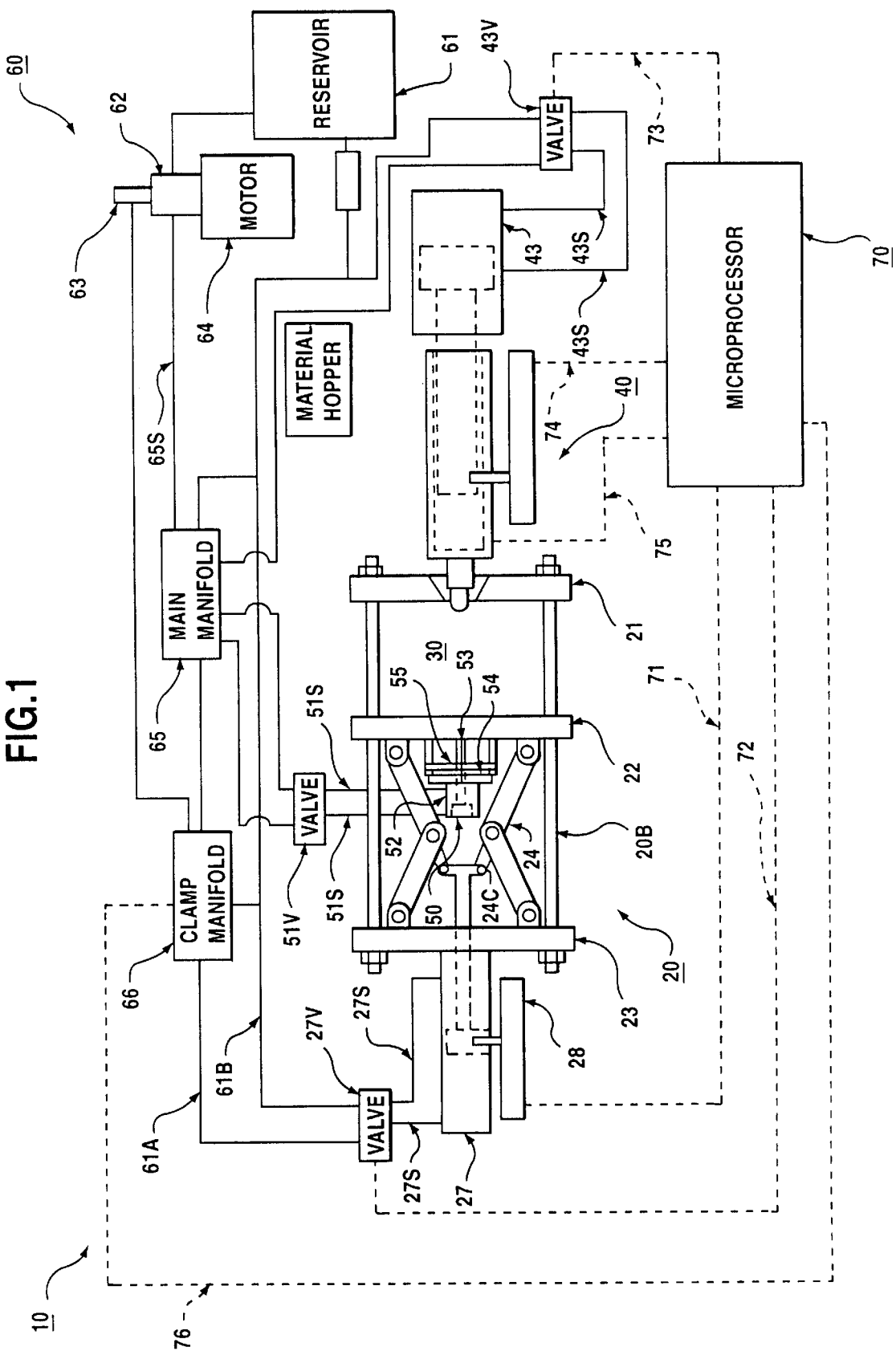
FIG. 1 is a diagrammatic view of an overall system for simultaneous injection and pressurization according to the invention.

With reference to the drawings, FIG. 1 illustrates a simultaneous injection and pressurization molding system 10 in accordance with the invention. The major components of the system 10 are a platen and clamping mechanism 20 for a mold by which optical quality products are produced; a cavity control arrangement 30 for the mold; a plasticizing and injecting unit 40 for the mold; an ejector assembly 50 for the mold; a hydraulic system 60 for operating the various components; and an overall system controller 70.

The platen and clamping mechanism 20 is formed by platens 21–23 and links 24. The platens 21 and 22 embrace and act against mold members 25 and 26 with respect to a mold cavity C that is formed between the members 25 and 26.

The cavity control arrangement 30 governs enlargement of the mold cavity in preparation for receiving a shot of plastic melt, and is thereafter able to operate in conjunction with the clamping mechanism 20 to reduce the size of the mold cavity.

The plasticizing and injecting unit 40 is responsible for preparing and injecting a shot of melt that is substantially equal or larger in volume than that of the finished part.

The ejector assembly 50 is used to clear the mold members, once the molded part has been formed and cooled below the glass transition temperature of the injected plastic.

The hydraulic system 60 supplies fluid for the operation of the various hydraulic components used throughout the overall system 10.

All components are coupled directly or indirectly to the controller 70, which is responsible for synchronizing the operations of all components in the overall system 10. The major components and their operations are described below.
(a) The Platen and Clamping Mechanism 20

With reference to FIG. 1, the mechanism 20 includes the platens 21–23, which are operatively connected to a clamp actuation system. The clamping mechanism 20 acts with the cavity control arrangement 30 to form the mold cavities which receive the melt generated in plasticizer unit 40. The clamp acutation system includes a hydraulic cylinder 27 which responds to hydraulic fluid supplied by a control valve 27v through hydraulic lines 27s. Control valve 27v is itself controlled in a similar manner to a valve 43v of the melt injector 41.

The valve 27v is actuated by the controller 70 which receives feedback indicative of plasticizer piston position from a transducer 28. Signal path 71 couples the control system 70 with transducer 28, whereas signal flow path 72 interconnects valve 27v and controller 70. High pressure hydraulic oil is supplied to valve 27v by a line 61a, and line 61b provides a hydraulic return. A conventional electric motor/pump system provides oil at the necessary pressure and flow rate. Valves 43v and 27v are preferably ratio and proportion valves. Such valves are available from Rexroth Corporation, Bethlehem, Pa. Transducers 28 and 44 can be a DCTM Linear Displacement Transducers from Temposonics Corporation of Plainview, N.Y.

The clamp mechanism 20 can be the clamp portion of a Computer Numerically Control (CNC) controlled injection molding machine. Traditionally, such machines controlled the injection end of the molding machine using fast responding valves of the servo or cartridge type and steppable or variable volume pumps. Recently, molding machine manufacturers have introduced digital control of clamp position and motion/velocity profiles to hydraulic, toggle clamp machines. Both machines are usable in the practice of the invention. However, suitably equipped toggle machines are preferred because of greater leverage. Hydraulic cylinder to movable platen motion in hydraulic clamp machines is one-to-one, whereas the mechanical leverage advantage of a toggle machine is 1:16–20. Thus, the positional error of a digitally-settable and trackable hydraulic cylinder is correspondingly reduced in the case of a toggle clamp machine, but is 1:1 in a hydraulic clamp machine. Furthermore, the mechanical clamp linkage employed by a toggle machine provides better platen parallelism. This is particularly important in multi-cavity molding machines.

Referring again to FIG. 1, the platen assembly 20 includes a stationary mold platen 21; a movable mold platen 22; and a clamp toggle platen 23. The platens 21–23 are mechanically linked by a set of tie bars 20b. The stationary platens 21 and 23 are rigidly connected to the tie bars 20b, and the movable platen 22 is slidably connected to the tie bars 20b between platens 21 and 23.

Extending between the stationary toggle platen 23 and the movable mold platen 22 are two pairs of clamp toggle members 24. The pivot points formed by associated clamp members are spanned by a clamp crosshead assembly 24c which is acted on by the piston of cylinder 27. When the hydraulic unit 27 elongates, the associated clamp members 24 approach alignment. This causes the movable mold platen 22 to approach the stationary mold platen 21. Conversely, when the cylinder 27 shortens or contracts, the associated toggle members 24 pivotally collapse or "toggle" to withdraw platen 22 away from platen 21. Such toggle clamp emchanisms can generate well in excess of one hundred tons of clamp force with 100–450 tonnage clamp machines common. CNC programmable toggle clamp injection molding machines are readily available.

(b) Cavity Enlargement Mechanism 30

Attention is now directed to the cavity enlargement mechanism 30. This functions to selectively enlarge the mold cavities so that melt can enter without encountering significant flow resistance or back pressure. Referring again to FIG. 1, the cavity enlargement system 30 includes a movable frame 31 which is supported by resilient members 32a and 32b.

Alternatively, a hydraulic system could be employed with a three-way solenoid connected to the controller 70 by a signal path. Under the command of the controller 70, the three-way valve could provide hydraulic fluid to the set of resilient members 32a and 32b.

The resilient members 32a and 32b are operatively mounted with respect to either platen 21 or 22, but preferably the movable platen 22 as shown in FIG. 2. The particular construction of the frame 31 and the members 32a and avoid the conventional mold parting line.

Where a valve is employed with the members 32a and b, it supplies fluid to the members 32a and b while simultaneously providing any necessary venting. The resilient members 32a and b can simply be compression springs with high elastic moduli. Preferably, however, the resilient members 32a and b are hydraulic cylinders which can be selectively extended upon receiving hydraulic fluid from their valve. The purpose and operation of the resilient members 32a and b are further described below.

(c) The Plasticising and Injection Unit 40

The plasticizing and injecting unit 40 is suitable for preparing a homogeneously-plasticized polymer, such as a polycarbonate or acrylic. The unit 40 preferably includes a barrel and screw plasticizer 41 of the type used in conventional injection molding machines. However, for optical molding, melt homogeneity, i.e., absence of solid polymer particles, and thermal uniformity, i.e., relatively constant temperature variation from start to end of shot delivery, are desired. Accordingly, the plastication units of conventional injection machines are usually modified by using downsized barrel and screw cominations, special screw designs employing controlled shear or melt barrier features, starved feeding of pellets, melt reservoir or accumulator stages. Such modifications are suitable in the practice of the invention.

The barrel and screw plasticizer 41 receives polymer pellets from a hopper 42 and is actuated by a hydraulic cylinder 43. Extension and retraction of the cylinder 43 are controlled by hydraulic fluid supplied through lines 43s by a valve 43v, which in turn is operated by the controller 70 through a signal path 73. Feedback to controller 70 is indicative of piston position provided by a transducer 44, as discussed below.

The plasticizer/injector unit 40 precisely accumulates and delivers the desired volume of plasticized melt. This can be achieved with a reciprocating screw injection unit that has a digitally settable and readable screw position, with plasticized melt being accumulated ahead of the screw tip in preparation for injection of the next shot. Screw position is preferably monitored using the transducer 44 which can be a potentiometer, a linear displacement transducer, or an optical encoder. The transducer 44 can be a Series DCTM Linear Displacement Transducer from by Temposonics Incorporated, Plainview, N.Y. The output of transducer 44 is delivered to the controller 70 through a signal path 74. As explained below, when the tranducer 44 signals that the injection of melt to the mold cavities has commenced, the pressurization portion of the process begins.

The injection fill rate is preferably high in comparison to prior art fill rates for coining or injection/compression molding and desirably is digitally settable and profileable. A wide variety of commercially available injection molding machines, including those designated as CNC (Computer Numerical Control) offer such process-control features.

(d) Ejector Assembly

The molding machine also includes a hydraulically actuated ejector assembly. The ejector assembly 50, shown in FIG. 1, includes a ratio valve 51v which is the functional equivalent of valves 27v and 43v. Hydraulic lines 51s from valve 51v feed a double-sided hydraulic ram 52 which actuates pin 53 slideably disposed in relation to a mount housing 54 and the movable platen 22. The mount housing 54 in turn is connected to and actuates a push bar 55 which extends through the movable platen 22 and acts on components internal to the mold to effect part ejection. The valve 51v is connected by signal flow path 75 to controller 70, and controller 70 activates it to eject the finished parts.

(e) Hydraulic System

A conventional hydraulic system 60 supplies pressurized fluid to the ratio valves 27v and 51v. The hydraulic system includes an oil reservoir 61 coupled to a relatively low pressure, high volume pump 62 and a relatively high pressure, low volume pump cartridge 63. The pumps 62 and 63 are commonly driven by an electric motor 64.

The high volume pump 62 feeds a passive manifold 65 by a line 65s. The passive manifold 65 in turn distributes the low pressure hydraulic fluid to an active manifold 66 and the control valve 27v. The active manifold 66 also is supplied with high pressure hydraulic fluid by high pressure pump 63, and is connected by signal flow path 76 to controller 70. The controller 70 can signal the manifold 66 to supply either high pressure, low volume oil or low pressure, high volume oil to the control valve 27v. This is to precisely profile the application of clamp pressure. Whereas conventional injection molding machines do not make large demands of hydraulic pressure, and flow simultaneously at both injection and clamp ends (cylinders 43 and 27). Pressurization clamping force and motions commence with the commencement of injection fill. In order to thus satisfy the hydraulic requirements of both cylinders 27 and 43 at any point in the process sequence for hydraulic fluid volume and pressure, the clamp manifold 66 is desirably added, working in combination with the main manifold 65 and pumps 62 and 63. Manifold 66 thus supplements, and isolates as needed, the clamp cylinder 27 and valve 27v from the main hydraulic circuit and manifold 65. The exhausts of valves 27v and 43v, and manifolds 65 and 66 are connected to a conventional hydraulic oil heat exchanger 67 which in turn is connected to the oil reservoir 61.

(f) Controller 70

The controller 70 is coupled, directly or indirectly to and controls the position and velocity of movable mold platen 22 through control of valve 27v and active manifold 66. It also controls the operation of plasticizing/injecting unit 40. It preferably controls the temperature of the moldset and the parts ejection mechanism, as further described below. The controller 70 could have a large variety of forms, including hydraulic, mechanical or pneumatic. The preferred controller 70 includes electronic circuitry. A hard wired or programmable CNC injection molding machine could be used to accomplish the various tasks assigned to controller 70. The program for a programmed control system should respond to digitally settable operator input values for position, time, velocity, pressure temperature, and settable sequences or modes. It also transmits information thru control signal paths 71–76, as well as responding interactively to real time measurements of the parameters, by comparing measured values from sensors such as 28 and 44 against desired values.

Additional but optional functions of controller 70 include memory or data storage, presentation of actual parameter values in real time by CRT (Cathode Ray Tube) display, compilation of production data into formats for supervisory review, and transmission or reception of electronic manifestations of data or parameter values through an on-line network or electronic linkage between equivalent machines and/or a hierarchial control/reporting supervisory terminal.

The controller 70 includes, but is not limited to factor-installed and field-retrofit CNC (Computer Numeric Control) or a microprocessor-controlled molding machine process controller. A number of such controllers, are commercially available for toggle and hydraulic type clamp machines. A representative controller 70 is the CAMAC XT Serias controller available from Cincinnati Millicron company of Cincinnati, Ohio.

II. Platen and Clamping Assembly

A more detailed presentation of the platen and clamping assembly 20, together with the cavity control mechanism 30, is shown in FIGS. 2A through 2E. The clamp crosshead assembly, and other components in operative contact with the platen assembly 20, are omitted for the sake of clarity.

As previously noted, the platen assembly 20 includes stationary platens 21 and 23, and a movable mold platen 22. The movable mold platen 22 can be precisely moved in relation to the stationary mold platen 21 under the supervision of controller 70. Stationary mold platen 21 supports a mold member 35; similarly, the movable mold platen 22 supports a complementary mold member 36. Surrounding the interval of separation between the two mold members 35 and 36 is a cavity control frame 31, which is supported by resilient members 32. The mold members 35 and 36, and the frame form mold cavities C.

It will be recognized that members 32, and their associated components which form the enlargable variable volume cavities C, could be supported alternatively by the stationary platen 21. Preferably, the resilient members 32 are associated with the movable platen 22.

The movable platen 22 also supports the ejector assembly 50 which has been discussed above. By virtue of the resilient members 32, the mold member 35 is movable relative to the ejector assembly and the complementary mold member 36. It should be noted that the injection/pressurization molding system 10 and the preferred platen assembly 20 could be used to mold a large variety of articles.

III. Alternative Overall System

Figure 3:
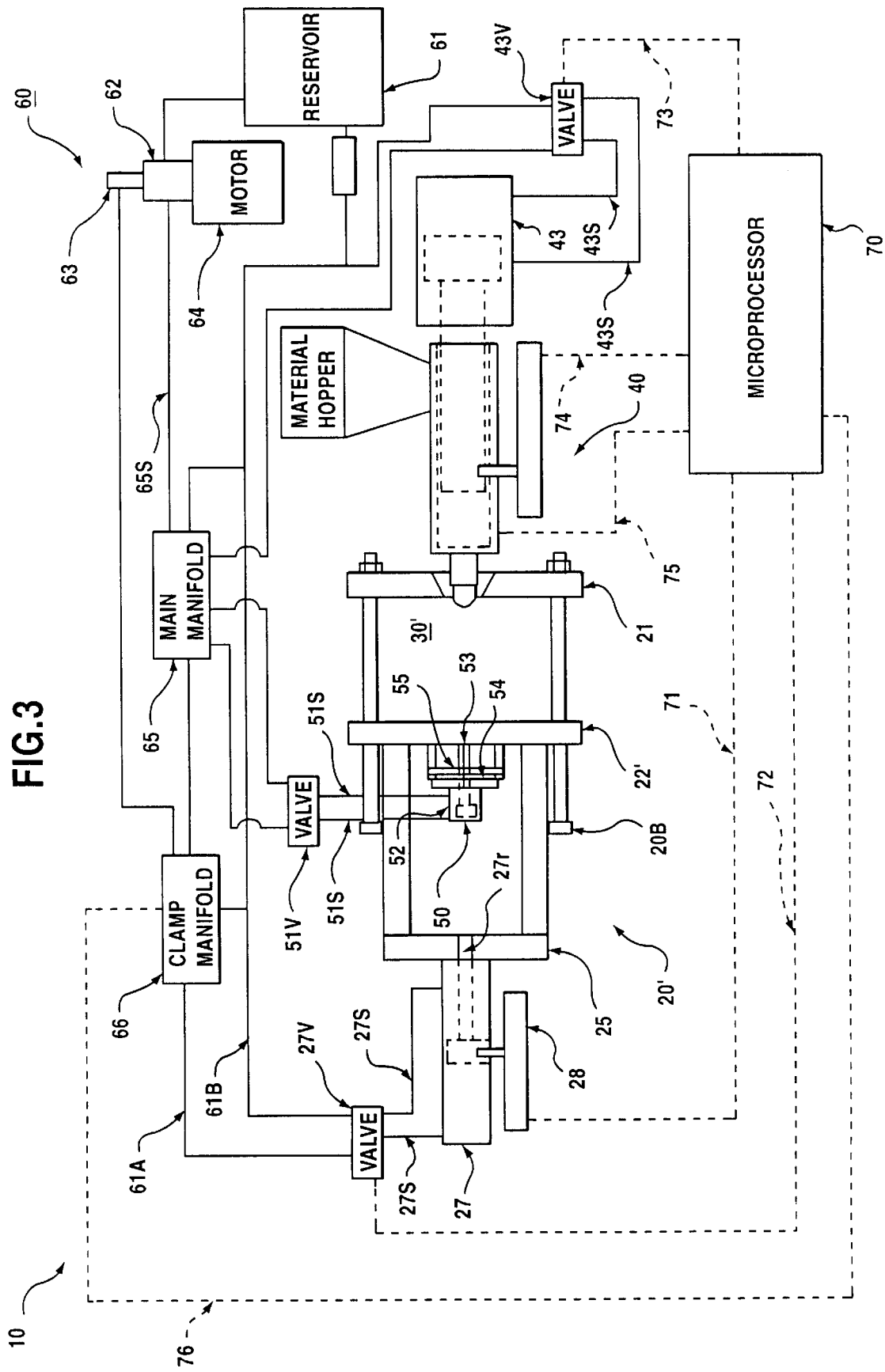
FIG. 3 is a diagramatic view of an alternative overall system for simultaneous injection and pressurization according to the invention.

An alternative overall system in accordance with the invention is shown in FIG. 3. In FIG. 3 the clamping mechanism 20 of FIG. 1 has been replaced by a hydraulically operated mechanism 20'. In the alternative mechanism 20' a pressure plate 25 is joined to and actuated by a piston rod 27r of the hydraulic cylinder 27. The pressure plate 25 is in turn joined to a movable platen 22' upon which the mold members 35 and 36 are mounted. However, instead of the cavity control arrangement 30 of FIG. 1 with a spring loaded frame 31, the embodiment of FIG. 3 employs a cavity arrangement 30' with a spring-loaded core plate 33' that acts with respect to a mold plate 34'. The spring loading between the two plates 33' and 34' is by spring members 35'a and 35'b.

The various stages of injection and pressurization for the embodiment of FIG. 3 are shown in FIGS. 4A through 4E.

Figure 4A:
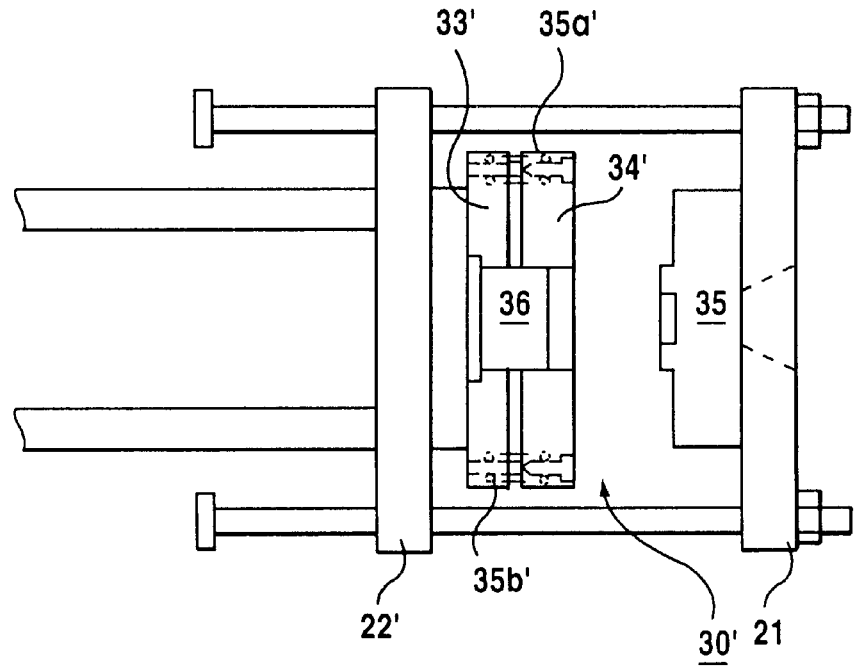
FIGS. 4A through 4E are diagrams showing stages of operation for the control mechanism used for simultaneous injection and pressurization in the system of FIG. 3.
Figure 4B:
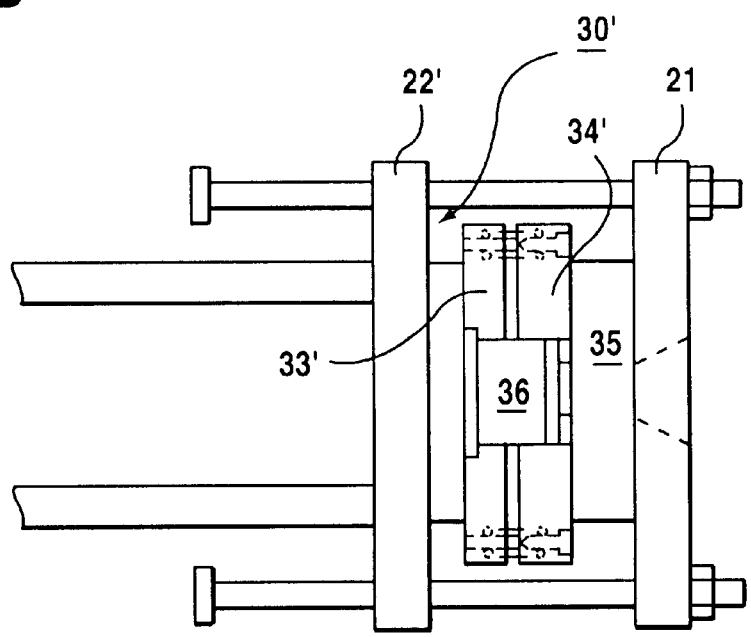
Figure 4C:
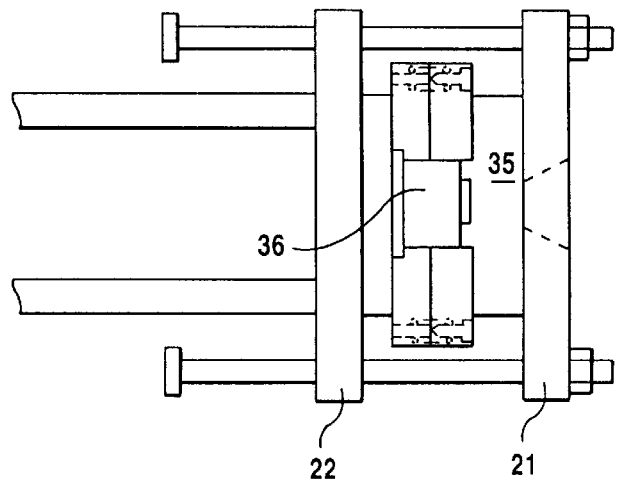
Figure 4D:
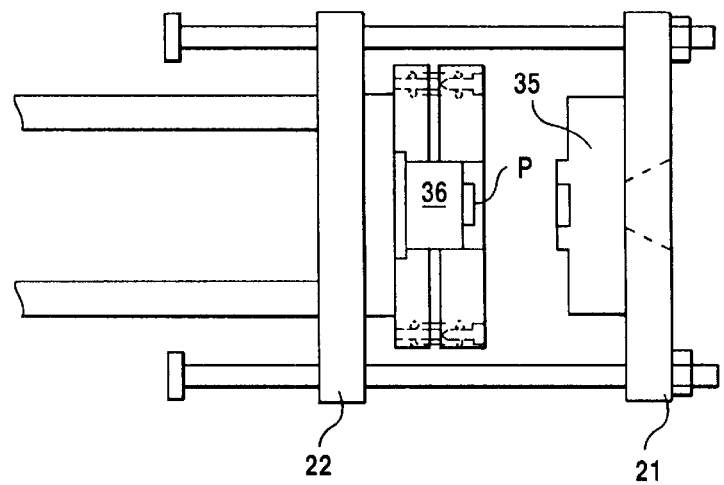

In FIG. 4A the mold is shown in its open position with the rod 27r of the hydraulic cylinder 27 fully retracted. In FIG. 4B the rod 27r has been moved to close the mold while leaving an enlarged cavity within the mold. In FIG. 4C the contents of the mold have been fully pressurized in accordance with the invention. In FIG. 4D the mold has been opened and in FIG. 4E the molded part is in the course of being ejected.

IV. The Mold

FIGS. 2A through 2E illustrate the mold members 35 and 36 for a machine to produce optical quality according to the present invention.

The mold member 35 is supported by the stationary mold platen 21, whereas the mold member 36 is supported by the movable mold platen 22. As noted above, the invention contemplates the interchange, including sequenced and controlled relative motions and positions, of selected components between the platens 21 and 22. The stationary platen 21 supports the mold member 35 which is preferably made from high quality tool steel, other tool-grade metal alloys or from glass or ceramics which possess an optical surface suitable for a molded product.

Venting gaps exist at the perimeter of the mold member. The venting gaps are sufficiently wide to prevent the escape of melt while permitting gases to vent. The venting gaps are in communication with venting slots, which have larger dimensioned openings or clearances.

The embodiment in FIGS. 2A through 2E is a single-cavity mold, but a larger number of cavities could be employed.

The stationary mold member is bored to form a continuous sprue. A sprue bushing is contained in the mold member and serves to precisely define and maintain the orifice size of the sprue and to seat against the nozzle of the molding machine. The sprue is in fluid communication with a runner system which carries the melt from the central sprue radially out to the mold cavities. The runner system is formed by a precise groove in the surface of the mold member.

A corresponding inner groove is formed by the mold member 36, and together those grooves serve to distribute the melt from the sprue to the mold cavities of which only a single cavity is shown in FIGS. 2A through 2E. Conventional gates interconnect the runners and the mold cavities.

Extending from the intersections of gates and runners are pressure relief ports. These ports terminate in excess polymer collection chambers. Conventional ejectors pins selectively push solidified polymer out of the polymer collection chamber at the appropriate time.

In the preferred embodiment, flow restrictive members can be adjusted to ensure that each mold cavity receives the appropriate amount of melt. The flow restrictive members extend into the runner system so as to adjustably impede the flow of melt to their respective mold cavities. The impedance presented by each flow restrictive member depends on the degree to which it is inserted into the gates.

The flow restrictive members are preferably adjustable. Associated with each flow restrictive member is preferably a cam with an inclined groove which holds captive an extension of the associated member, such that movement of the cam parallel to the parting line or plane causes movement of the flow restrictive member in a direction perpendicular to the parting plane. Each cam is preferably coupled to a shaft which extends through the stationary clamping plate to an adjustment knob. Thus, by rotating the knobs the positions of the individual flow restrictive members can be independently and precisely controlled.

Mold balancing is important when different configurations are being simultaneously molded, that is, when some parts have larger volumes than others, or restrictive portions which present larger impedances to melt flow. The flow restrictive members are then adjusted to compensate for differences in the mold cavities.

The stationary clamping plate and the mold members can also include conventional coolant flow channels. Conventional leader pins can extend from the surfaces of the mold members to register opposing members as the mold is closing or is in its closed state.

A runner system is formed by registerd grooves in the surfaces of the mold members. An optimal retention device serves to hold a mold member at a fixed distance relative to the clamp plate throughout the part ejection cycle, so the ejection stroke provides positive motion in both forward and return strokes. A suitable retention mechanism operates in response to the control system by hydraulic fluid entering and leaving the device through its feed line.

One mold member is affixed to the movable clamping plate. The resilient elements are preferably housed within a spacer which determines the minimum distance between the movable clamping plate and the mold member. This distance can be increased by the action of the "resilient members" which are preferably hydraulic cylinders. When the resilient members elongate, the mold member moves away from the movable clamping plate.

The ejector assembly (shown diagrammatically in FIG. 1) includes a die insert retainer and ejector plate. The ejector plate is selectively movable with respect to the movable clamping plate 22. A clearance hole admits a push bar which effects relative movement. Prior to ejection of the molded part, however, the plate is preferably held rigidly against the movable clamping plate 22 through the retracted position of the ejector system's hydraulic cylinder. Such ejector assemblies and techniques are generally well known in the art.

Extending from the ejector plate are ejector pins. These pins are slidable with respect to the mold member and make contact with the runner. When ejection of the mold part is desired, the machine process controller actuates an ejection hydraulic cylinder, which drives forward a push bar and moves the ejector plate relative to the mold member. This causes the ejector pins to slide within mold member and exert pressure on "frozen" material within the mold. Simultaneously, the die members travel forwardly to allow the molded parts to clear the cavity sides. This combined motion ejects the molded parts without scratching their optical surfaces.

As previously noted, the controller for the ejector cylinder position and velocity provides a controlled compressive stroke to all variable volume cavities simultaneously and equally.

Such an ejector-initiated driving force is the functional equivalent of a movable-platen-initiated pressurizing force, since both can be digitally settable and controlled for position and velocity. In both cases the rigid connection of machine-supplied pressurizing driving forces to movable mold members in single cavity or multi-cavity mold designs has equal, simultaneous and predictable effects on the various mold cavity volumes. In practice, movable platen-initiated pressurizing driving forces are preferred since injection machines typically are not equipped with large ejector cylinders.

In addition, the use of a hydraulic ejector cylinder for pressurization complicates the molded-part ejection function, which is mechanically or electronically decoupled from the pressurization function. Another consideration in the use of ejector cylinder motion for pressurization is the need to account for positional sensing error.

The "floating" embodiment permits rapid filling of the mold cavities. As the cavities fill the floating member simultaneously moves to allow rapid filling without causing significant back pressure.

Venting slots and coolant channels are included in the mold member and ejector plate supports. The venting slots are in fluid communication with venting gaps, which are preferably 0.001 to 0.002 inch, like the gaps in the mating mold member. The venting slots vent the entire periphery of the mold members to increase fill rates by reducing back pressure. The coolant channels and plate supports are conventional.

V. Operation

The operation of the injection/pressurization machines 10 and 10' illustrated in the drawings has general applicability for all molding processes.

(a) Clamping system of FIG. 1

Figure 2A:
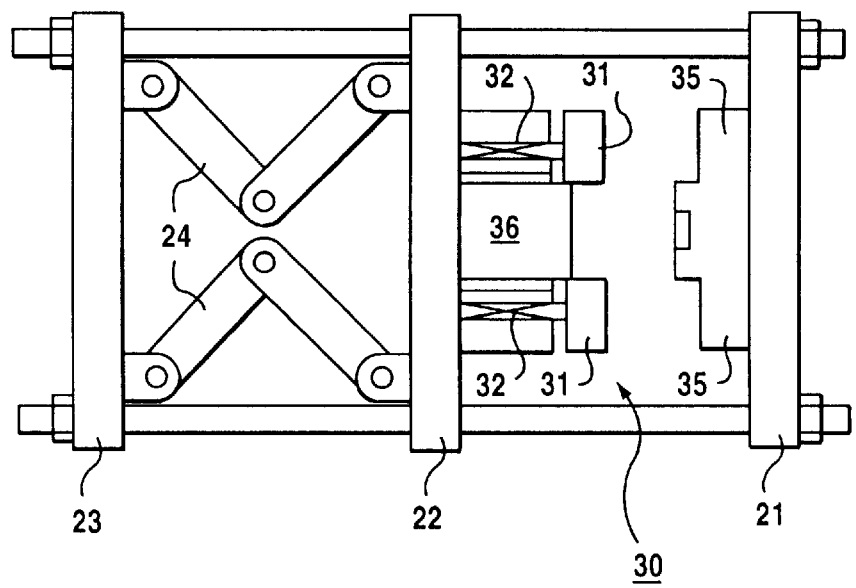
FIGS. 2A through 2E are diagrams showing stages of operation for the clamp assembly and cavity control mechanism for the simultaneous injection and pressurization system of FIG. 1.

Operation for the clamping system of FIG. 1 is illustrated in FIGS. 2A though 2E.

In FIG. 2A the plate assembly is in its fully open position following the ejection of a previously molded part. The hydraulic clamp cylinder 27 of FIG. 1, under the direction of the controller 70, has caused the clamp members 24 to buckle, withdrawing the movable mold platen 22 away from the stationary mold platen 21.

An injection reciprocating screw (not shown) within the plastication barrel 41 is in its fully retracted position in preparation for injection of plastic resin. In addition, the ejector assembly 50 is in its fully retracted position relative to the mold member 36. The resilient member 31 is in its fully expanded position.

Figure 2B:
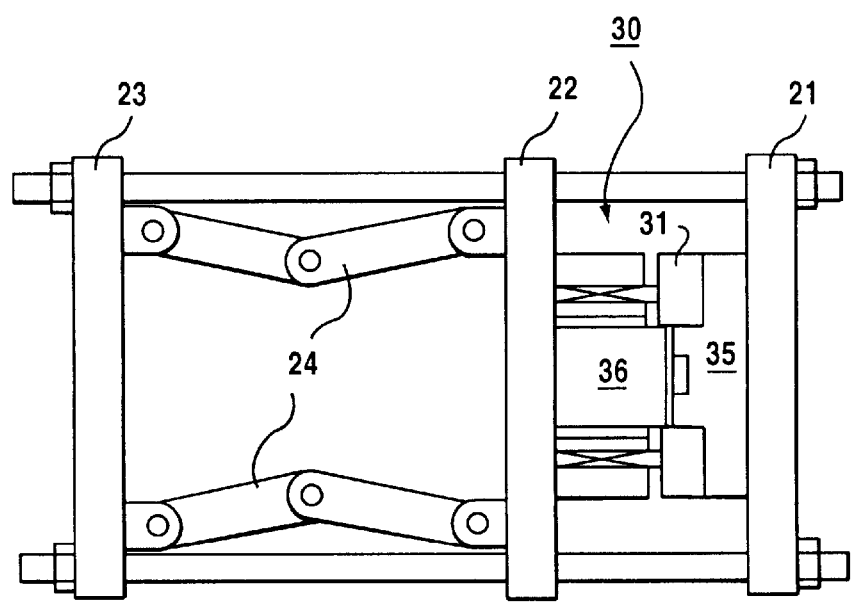

FIG. 2B illustrates the continuation of the molding cycle. A pressing stroke causes contact of the resilient member 31 with the mold member 35. The mold members 35 and 36 are in position to receive the injection of melt, with an increased volume of the mold cavity. This has resulted from activation of the controller 70 to cause hydraulic cylinder 27 to elongate, thereby "straightening" associated pairs of toggle clamp members 24 and causing the movable mold platen 22 to approach the stationary mold platen 21.

This results in a fully closed parting line displaced from the mold cavity and sealing the enlarged molding cavity formed between mold members 35 and 36. At this point, the resilient member 31 is held against the mold member 35 with sufficient force to seal the parting line and prevent flash.

A sealing force of approximately 100,000 pounds has been found sufficient for a four cavity mold, but other sealing forces could be used depending on the particular plastic chosen, its melt temperature, viscosity, surface tension, and the projected cross-sectional area of the runner system, among other factors.

The resilient member 31 provides the desired sealing force. If the resilient member 31 is spring-loaded, the compression when the mold members approach generates the sealing force. If the resilient member 31 is operated by hydraulic cylinders, the sealing force can be controlled independently of the degree of pressure exerted by the hydraulic cylinder 27. Preferably, the controller 70 determines the extension and contraction of the resilient member 31.

In one embodiment, the pressure exerted on the resilient member 31 causes hydraulic fluid within associated cylinders to flow out of the cylinders into an accumulator, which includes a resilient member (a metallic or air spring, for example), so that, in effect, the hydraulic cylinders of the resilient member 31 function like simple springs.

Figure 2C:
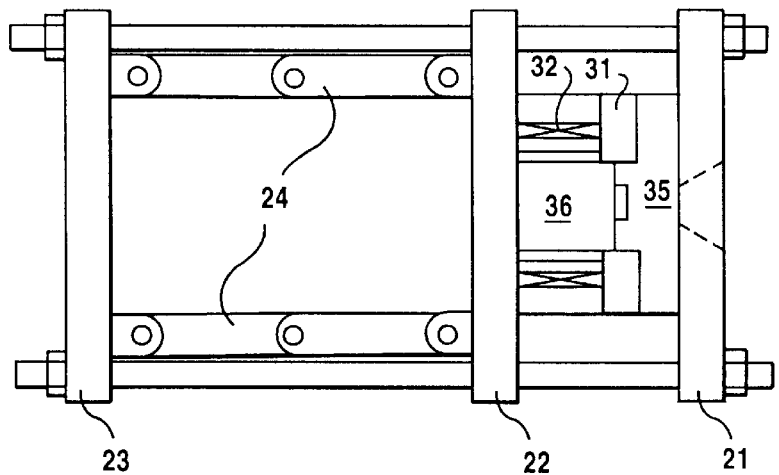

FIG. 2C illustrates the next step in the process. Once a sufficient sealing pressure is developed at the parting line, controller 70 activates valve 43b to inject melt into the enlarged cavity between the mold members 35 and 36. The measured volume of delivered melt ("shot size") is preferably determined by the controller 70 acting in combination with the injecting unit 40.

The onset of movable platen clamping force stroke can alternatively be controlled by time, by the position of the reciprocating-injecting screw of injecting unit 40, or by a pressure sensor mounted in the mold. Control based on time is "open loop". Cavity pressure triggering of clamping requires that the injected melt volume exceed the enlarged cavity volume. This results in pressurization of the molten polymer to a preset cavity pressure level. Cavity fill against increasing pressure, however, produces undesirable molded-in stresses in the molded part. Accordingly, it is preferred to trigger the onset of clamping by the position of the reciprocating screw, for which advancement is halted when full delivery of the shot has been completed. Transducer 44 in FIG. 1 precisely monitors the screw position.

Through the precise control of the injector 40 by the controller 70, and the adjustment of flow restrictive members if necessary, a premeasured amount of molten polymer is distributed to the cavity against virtually no back pressure once the melt reaches the cavity, yet in a precise and interactively controlled manner.

Simultaneously, with the commencement of mold closure from the position shown in FIG. 2B to the position shown in FIG. 2C, the injector 40 begins delivering a precisely predetermined volume of melt. This corresponds to pre-specified screw positions on the transducer 44 which triggers the start of clamping. The controller 70 causes the cylinder 27 to elongate and advance the movable mold platen 22 towards stationary mold platen 21. The force exerted on the movable mold platen 22 is transmitted to the mold member 36. Thus, the full clamping force produced by the hydraulic toggle clamp is delivered to the mold.

Preferably, the position and velocity of the movable platen 22 are profiled to create a two-stage pressurization of the melt. During the first stage, the mold members 35 and 36 are driven toward one another quickly to vent gases within the molding cavity and redistribute the melt isotropically. With reference to FIG. 1, the controller 70 delivers low pressure, high volume hydraulic fluid to ratio valve 27v. Following this initial stage, a slower pressurization of the melt takes place while the polymer cools and solidifies under continuing pressure, causing the molded part to conform to the mold members 35 and 36 and correct for thermally-induced shrinkages.

The mold remains in a closed state until the melt drops below the glass transition temperature of the plastic. Once this point is reached, the mold can be opened. The initial stage of venting and relatively fast melt redistribution preferably lasts only approximately $1/20$ to $1/5$ as long as the second stage (and subsequently), which in turn is continued throughout the remainder of the mold cycle, until just before the mold is opened and the part ejected. The rate of curing depends on the rate at which heat is withdrawn from the melt. The controller 70 can cause coolant to move through mold channels to speed this process.

Figure 2D:
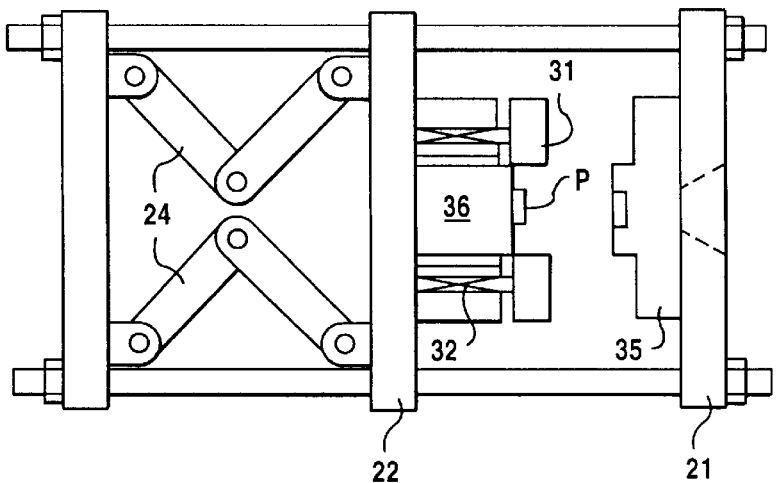

FIG. 2D illustrates the next step of the molding process. Once sufficient time has passed for the glass transition temperature of the plastic to be reached, controller 70 activates cylinder 27 to withdraw the movable mold platen 22away from the stationary mold platen 21. This causes the parting line to fully open and facilitate removal of the molded part.

Figure 2E:
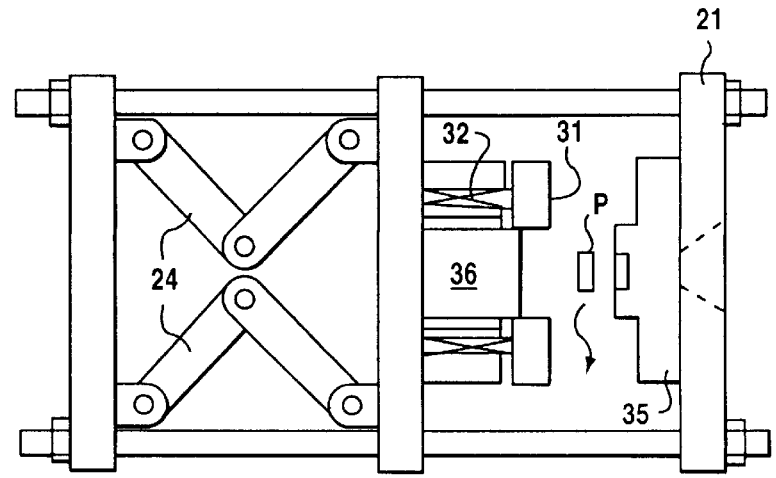

FIG. 2E shows part ejection. Resilient member 31 is held in its retracted position. An ejector plate of the ejector assembly 50 is extended into the mold by a hydraulic cylinder 52 to eject the molded part.

(a) Clamping system of FIG. 3

Operation for the clamping system of FIG. 3 is illustrated in FIGS. 4A through 4E.

In FIG. 4A the plate assembly is in its fully open position following the ejection of a previously molded part. The hydraulic clamp cylinder 27 of FIG. 1, under the direction of the controller 70, has withdrawn the movable mold platen 22 away from the stationary mold platen 21.

An injection reciprocating screw (not shown) within the plastication barrel 41 is in its fully retracted position in preparation for injection of plastic resin. In addition, the ejector assembly 50 is in its fully retracted position relative to the mold member 36. The resilient members 31a and b are in their fully expanded positions.

FIG. 4B illustrates the continuation of the molding cycle. A pressing stroke causes contact of the resilient members 31a and b with the mold member 35. The mold members 35 and 36 are in position to receive the injection of melt, with an increased volume of the mold cavity. This has resulted from activation of the controller 70 to cause hydraulic cylinder 27 to elongate, thereby causing the movable mold platen 22 to approach the stationary mold platen 21.

This results in a fully closed parting line displaced from the mold cavity and sealing the enlarged molding cavity formed between mold members 35 and 36. At this point, the resilient members 31a and b are held against the mold member 35 with sufficient force to seal the parting line and prevent flash.

A sealing force of approximately 100,000 pounds has been found sufficient for a four cavity mold, but other sealing forces could be used depending on the particular plastic chosen, its melt temperature, viscosity, surface tension, and the projected cross-sectional area of the runner system, among other factors.

The resilient members 31a and b provide the desired sealing force. If the resilient members 31a and b are spring-loaded, the compression when the mold members approach generates the sealing force. If the resilient members 31a and b are operated by hydraulic cylinders, the sealing force can be controlled independently of the degree of pressure exerted by the hydraulic cylinder 27. Preferably, the controller 70 determines the extension and contraction of the resilient members 31a and b.

In one embodiment, the pressure exerted on the resilient member 31 causes hydraulic fluid within associated cylinders to flow out of the cylinders into an accumulator, which includes a resilient member (a metallic or air spring, for example), so that, in effect, the hydraulic cylinders of the resilient member 31 function like simple springs.

FIG. 4C illustrates the next step in the process. Once a sufficient sealing pressure is developed at the parting line, controller 70 activates valve 43b to inject melt into the enlarged cavity between the mold members 35 and 36. The measured volume of delivered melt ("shot size") is preferably determined by the controller 70 acting in combination with the injecting unit 40.

The onset of movable platen clamping force stroke can alternatively be controlled by time, by the position of the reciprocating-injecting screw of injecting unit 40, or by a pressure sensor mounted in the mold. Control based on time is "open loop". Cavity pressure triggering of clamping requires that the injected melt volume exceed the enlarged cavity volume. This results in pressurization of the molten polymer to a preset cavity pressure level. Cavity fill against increasing pressure, however, produces undesirable molded-in stresses in the molded part. Accordingly, it is preferred to trigger the onset of clamping by the position of the reciprocating screw, for which advancement is halted when full delivery of the shot has been completed. Transducer 44 in FIG. 1 precisely monitors the screw position.

Through the precise control of the injector 40 by the controller 70, and the adjustment of flow restrictive members if necessary, a premeasured amount of molten polymer is distributed to the cavity against virtually no back pressure once the melt reaches the cavity, yet in a precise and interactively controlled manner.

Simultaneously, with the commencement of mold closure from the position shown in FIG. 4B to the position shown in FIG. 4C, the injector 40 begins delivering a precisely predetermined volume of melt. This corresponds to pre-specified screw positions on the transducer 44 which triggers the start of clamping. The controller 70 causes the cylinder 27 to elongate and advance the movable mold platen 22 towards stationary mold platen 21. The force exerted on the movable mold platen 22 is transmitted to the mold member 36. Thus, the full clamping force produced by the hydraulic toggle clamp is delivered to the mold.

Preferably, the position and velocity of the movable platen 22 are profiled to create a two-stage pressurization of the melt. During the first stage, the mold members 35 and 36 are driven toward one another quickly to vent gases within the molding cavity and redistribute the melt isotropically. With reference to FIG. 1, the controller 70 delivers low pressure, high volume hydraulic fluid to ratio valve 27v. Following this initial stage, a slower pressurization of the melt takes place while the polymer cools and solidifies under continuing pressure, causing the molded part to conform to the mold members 35 and 36 and correct for thermally-induced shrinkages.

The mold remains in a closed state until the melt drops below the glass transition temperature of the plastic. Once this point is reached, the mold can be opened. The initial stage of venting and relatively fast melt redistribution preferably lasts only approximately $\frac{1}{20}$ to $\frac{1}{5}$ as long as the second stage (and subsequently), which in turn is continued throughout the remainder of the mold cycle, until just before the mold is opened and the part ejected. The rate of curing depends on the rate at which heat is withdrawn from the melt. The controller 70 can cause coolant to move through mold channels to speed this process.

FIG. 4D illustrates the next step of the molding process. Once sufficient time has passed for the glass transition temperature of the plastic to be reached, controller 70 activates cylinder 27 to withdraw the movable mold platen away from the stationary mold platen 21. This causes the parting line to fully open and facilitate removal of the molded part.

Figure 4E:
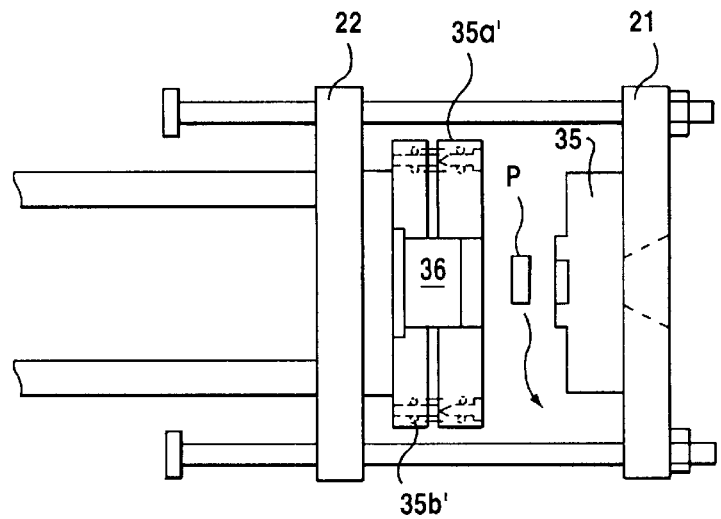

FIG. 4E shows part ejection. Resilient member 31 is held in its retracted position. An ejector plate of the ejector assembly 50 is extended into the mold by a hydraulic cylinder 52 to eject the molded part.

What is claimed:

1. A method of forming an article having a prescribed volume and mass from a molten plasticized resin using an injection molding machine, comprising the steps of:
    (a) forming an oversized mold cavity with respect to an opposing pair of relatively movable mold members of said injection molding machine between which mold members said article is formed;
    (b) injecting into said oversized mold cavity a volume of plasticized resin exceeding the prescribed volume of the article to be formed and having a mass at least equal to the prescribed mass of the article;
    (c) applying force to said mold members to reduce a volume of said mold cavity and compress said plasticized resin therein simultaneously with the injection of said resin thereby to form said article.

2. The method of claim 1 wherein said force is maintained on said mold members until said article is completely formed.

3. The method of claim 1 wherein said machine has fixed and movable platens directly mounting said mold members, so that enlargement of said mold cavity is determined by a distance between the movable platen and the fixed platen.

4. The method of claim 1 wherein the reduction of said volume of said mold cavity and the compression of said plasticised resin commence with the injection of said resin.

5. The method of claim 1 wherein the compression of said plasticised resin commences before termination of the injection of said resin.

6. The method of claim 1 wherein pressure is applied to said relatively movable mold members of said oversized cavity before commencement of the injection of said resin.

7. The method of claim 2 wherein said injection of said resin is in excess of an amount needed to fill said oversized mold cavity.

8. The method of claim 1 for forming an article from a molten resin, wherein said injection molding machine has first and second mold platens, first and second mold members directly supported by said first and second mold platens, and both of said mold members are surrounded by a relatively movable frame;
    whereby said oversized mold cavity is formed by contact of said frame with one of said mold members.

9. The method of claim 1 wherein one of said mold members is surrounded by a pair of frames which are movable relative to one another.

10. A method of forming a plurality of articles from a molten plasticized resin using an injection molding machine having first and second mold platens, first and second mold members, each having a corresponding plurality of mold structures, comprising:

(a) forming a plurality of pre-enlarged mold cavities by adjusting relative positions of opposing mold members, at least one of which is capable of movement relative to the other, said mold cavities having dimensions determined by distance between the platens, and said members initially being separated to form pre-enlarged cavities with volumes each greater than a maximum volume occupied at atmospheric pressure by the molten plasticized resin to be injected into the cavity, thereby to receive plasticized resin without introducing back pressure;

(b) injecting into each pre-enlarged mold cavity a volume of plasticized resin larger than a volume of the article to be formed but insufficient to fill each pre-enlarged cavity;

(c) commonly and simultaneously applying a main clamp force of the injection molding machine before commencement of said injection to reduce the volumes of the mold cavities and fill the reduced-volume mold cavities while venting gases; and (d) maintaining the applied main clamp force until a final clamp lock-up position is reached, thereby compressing the resin until slight excess is forced into a pressure relief outlet and the resin solidifies.

11. The method of claim 10 wherein the step of forming the mold cavities comprises reducing the distance between the first and second mold platens while maintaining a distance between associated pairs of mold members.

12. The method of claim 10 wherein a mass of plasticized resin injected into each mold cavity exceeds a mass of the article formed therein.

13. The method of claim 10 wherein the resin is selected from the group consisting of acrylics, polymer styrenes, acrylic styrenes and copolymers of polycarbonate and styrene.

14. The method of claim 10 wherein the first platen and the first mold member are stationary and the second platen and the second mold member are movable; wherein the mold cavities forming step comprises extending the second mold member relative to the first mold member while surrounded by a relatively movable pair of frames.

15. The method of claim 10 wherein the force applying step comprises simultaneously compressing and injecting said resin.

16. The method of claim 10 wherein the movable mold member is controlled to have an initial fast stroke to primarily remove gas in the mold cavities followed by a slower stroke to compress the resin to compensate for cooling-induced shrinkage.

* * * * *